(12) United States Patent
Webb (10) Patent No.: US 7,104,727 B1
(45) Date of Patent: Sep. 12, 2006

(54) PIPING SYSTEM WITH TRANSITION COUPLING

(76) Inventor: Michael C. Webb, 6208 Barclay Woods Ct., Raleigh, NC (US) 27614

( * ) Notice: Subject to any disclaimer, the term of this patent is extended or adjusted under 35 U.S.C. 154(b) by 0 days.

(21) Appl. No.: 11/061,639

(22) Filed: Feb. 22, 2005

(51) Int. Cl.
B53G 53/00 (2006.01)
F17D 1/02 (2006.01)

(52) U.S. Cl. .................. 405/53; 405/52; 137/236.1; 137/263

(58) Field of Classification Search ........... 405/52–54, 405/154.1; 137/236.1, 263; 141/59; 285/95, 285/149.1; 28/152.1
See application file for complete search history.

(56) References Cited

U.S. PATENT DOCUMENTS

| | | | | | |
|---|---|---|---|---|---|
| 2,613,958 | A | * | 10/1952 | Richardson | 138/140 |
| 3,606,659 | A | * | 9/1971 | Robbins | 138/109 |
| 5,955,657 | A | * | 9/1999 | Bravo | 137/236.1 |
| 5,975,110 | A | * | 11/1999 | Sharp | 137/234.6 |
| 6,116,817 | A | * | 9/2000 | Osborne | 405/52 |
| RE37,114 | E | * | 3/2001 | Youngs et al. | 405/52 |
| 6,843,506 | B1 | * | 1/2005 | Osborne | 137/797 |

FOREIGN PATENT DOCUMENTS

JP        63083500    * 4/1998 ............ 137/236.1

* cited by examiner

Primary Examiner—Jong-Suk (James) Lee
(74) Attorney, Agent, or Firm—Joseph R. DelMaster, Jr.; Drinker Biddle & Reath LLP (57) ABSTRACT

In a pipeline system having a plurality of pipe segments joining a fluid supply tank to a fluid dispenser, the invention includes a pipe coupling assembly for use on at least one terminal end of a fluid transfer pipe, where the transfer pipe has an inner tubular member for transferring fluid and an outer tubular member and an interstitial space there between. The coupling assembly comprises a transition coupling for attachment to the pipe segment to provide a first path for the fluid in the inner tubular member and a second path for the interstitial space. The coupling assembly further comprises a transition tube assembly for attachment to the transition coupling to provide separate paths for the transfer fluid and the interstitial space, where the interstitial space provides a means for performing leak detection or fitting integrity tests during application of either a vacuum condition or pressurized gas input via such selective access.

19 Claims, 9 Drawing Sheets

PIPING SYSTEM WITH TRANSITION COUPLING

FIELD OF THE INVENTION

This invention relates to transition coupling and fitting assemblies for connecting segment of pipes into systems. More particularly, the invention relates to a new system using an assembly for coupling coaxial pipes, such as flexible coaxial pipes, of the type used in environmentally conscious petroleum transfer systems.

BACKGROUND OF THE INVENTION

Because vehicle fueling facilities, like retail service stations, are becoming more environmentally conscious, a shift has occurred from the use of rigid underground piping to flexible piping. A primary reason for this shift from rigid to flexible piping is that flexible piping has fewer pipe connections than rigid systems since the flexible system can accommodate virtually any orientation or alignment of the pumps and tanks. With fewer pipe connections, the piping system is considered more environmentally safe. Movement of the underground storage tank due to the shifting underground tanks is also more easily accommodated by flexible piping.

Flexible underground piping systems have also gained popularity because these systems are more easily installed than rigid piping systems. Rigid systems require on-site measurements and cutting of each piece, along with the intensive labor involved in making two pipe connections every time the piping undergoes a change in direction. Flexible underground piping systems thus can be installed at a lower total cost than conventional rigid piping systems.

As part of the development of underground piping systems, it has been necessary to provide a means of secondary containment for both the primary piping and for the associated fittings in order to provide a margin of safety in case of leaks or damage to the system. The secondary containment pipe protects the primary supply pipe from the ambient environment and from inadvertent damage, and further, provides for a method of containing the fluid from the primary pipe in the event of a rupture or leak of the primary pipe.

Several types of double wall flexible piping systems are known. These include systems which have a small flexible pipe housed in a larger flexible containment pipe. One such system is described in U.S. Pat. No. 4,971,477 (the '477 patent), wherein access chambers are separated by a secondary containment pipe which is sized to accept a primary pipe within the secondary containment pipe. This system, however, has a number of drawbacks, including the fact that the primary and secondary pipes are installed separately and that fittings are required for each of the two types of pipes. Moreover, because each of the pipes connects with an access chamber, a rapid and simple method of monitoring the condition of the primary piping may not be possible. Although the sumps in the '477 patent are capable of being monitored visually by an attendant, but the demand of other tasks to be performed by the attendant eventually leads to fewer and fewer inspections. Most important is that leaks may occur randomly, not only just prior to a visual inspection, and especially when inspections grow less frequent over time.

As taught in the '477 patent, the flexible piping and the secondary containment piping require a sump or access chamber each time that sections of the flexible pipe are joined together. Most other systems also require a sump at each location where sections of flexible pipe are joined together.

Other systems which have met with success using coaxial pipes and a secondary containment pipe are shown in U.S. Pat. No. 5,263,794 (the '794 patent), and U.S. Pat. No. 5,297,896 (the '896 patent) the entire disclosures of which are incorporated herein by reference. The advantages of flexible pipe systems are disclosed by these patents. Nevertheless, it is necessary to make individual connections each time sections of pipes are joined together.

The '794 and the '896 patents disclose various definitions that have become standard in the industry, for example, "tanks", "pumps", "dispensers" and the like. Also disclosed therein are descriptions of double wall piping systems that provide secondary containment. In a system that employs secondary containment, a primary pipe carries the petroleum product or other hazardous material from the underground tank to the aboveground dispenser. The primary pipe, also known as the supply pipe, is located inside a larger, outer secondary containment pipe, known also as the containment pipe. Access sumps and other containment components are located around the tank pump, underneath the dispenser and at various junctions of piping.

Recently, an effective system has become available and has met with substantial success in the industry. This pipe system's supply pipe is a flexible double wall pipe comprising an inner pipe and an outer pipe in radial communication with the outside surface of the inner pipe. Most preferred are pipes of this configuration that have internally facing longitudinal ribs on the inner surface of the outer pipe, or externally facing longitudinal ribs on the outer surface of the inner pipe. In either such design, a plurality of circumferentially spaced ribs extend radially from one pipe member to the other pipe member such that the ribs have a surface that confronts and snugly engages the other pipe to define an interstitial space between the two pipes.

The flexible double wall pipe described immediately above is disclosed in my U.S. Pat. No. 5,527,130 entitled Environmentally Safe Underground Piping System, the entire disclosure of which is incorporated herein by reference. The co-axial pipes disclosed in the '130 patent are normally suited for use with hazardous material transfer pipe systems of the type described herein. The inner most layer is formed from a material such as nylon, PVDF, polyethylene or the like, which is highly resistant to the hazardous transfer fluid. The outer jacket of the double wall pipe which is exposed to the ambient underground environment is formed from a material such as nylon, PVDF, polyethylene or the like, which is highly resistant to the ambient underground environment and which does not degrade over time. Between the outer wall of the primary pipe and the inner wall of the containment pipe is an intermediate layer, either in the form of ribs projecting from one surface to the other, or in a standoff layer formed from a cylindrical portion having circumferentially spaced ribs that define the interstitial space between the two pipes. As noted in the '130 patent, other layers can be present in the design, such as intermediate layers formed from lower cost materials which do not directly contact either the hazardous material being transported or the ambient underground environment.

The environment for both surfaces of the pipe is an important design aspect, which needs to be considered. Product components which make up primary or secondary containment systems for hazardous liquids, and in underground applications particularly, must be designed, manufactured and individually tested to insure that they will not fail due to material deterioration.

The material employed are preferably resistant to hydrolysis, as it is expected that water and high moisture conditions will exist in underground burial applications both for contained and non-contained underground piping applications. Resistance to hydrolysis is important since some elastomers suffer an irreversible breakdown when exposed for lengthy periods to hot water, moisture vapor or tropical climates.

In addition to the tanks, pumps, pipes and dispensers used in underground piping systems, sumps are used as part of the secondary containment system. One sump surrounds the pump on the tank and another sump is generally positioned below each dispensing system. Sumps typically have a base portion, a riser and a lid and are provided with means for permitting piping to enter and exit the sump. One type of sump called a tank sump is located on top underground storage tank and under a surface access manhole. Contained within the tank sump is a dispensing pump whereby the fuel is directed upwardly from the tank to the dispensing pump and outwardly through the opposite side of the tank sump to the next part of the system. Each time the pipe sections are connected to one another, these pipe connections are typically contained within another sump that, of course, requires a pipe penetration seal to seal the pipe entry or exit through the sump.

As can readily be appreciated, every pipe must eventually end. It then becomes necessary to connect that end of the pipe to either a pump, to a fitting joining two or more other pipes or directly to a shear valve. Typically the inner, primary supply pipe is directly connected to fittings and the like, and another primary supply pipe is connected to the other end or ends of the fittings. Merely connecting the inner supply pipes, as in the past, has been no different than connecting a single pipe system. In the evolution of piping systems as discussed above, the relationship of the outer, secondary containment pipe to the system has become more complex.

Initially, non-flexible pipes functioning as a secondary containment pipe were attached to the sump or other chambers by enlarging the hole in the sump to permit entry or exit of the outer pipe from the sump, and later by various fastening and sealing methods and devices. Initially, the interstitial space between the inner and outer pipes served as a conduit for fluid leakage to flow downhill into the next sump in the piping system. Leaks could come from fuel from the inner pipe, or from the outer pipe as ambient environmental liquids, such as water, penetrate the outer pipe.

Leak detection initially consisted of opening the sump chamber and inspecting the bottom of the sump for fluid accumulation. Of course, whatever can be visually inspected can be monitored automatically. Systems were proposed for monitoring the liquid levels in the bottom of sumps. However, every sump had to have a monitoring device since each sump, by design, represented a low point where fluid could collect. The difficulty in such two pipe systems can easily be seen by viewing FIG. 2 of '477 patent where the outer pipe has a very limited, minor function of simply isolating the primary supply pipe from the ambient environment. Also shown in that Figure is the way that the interstitial space between the primary pipe and containment pipe merely opened into the larger sumps without any recognition that there may be other purposes for the interstitial space. As is shown in FIG. 3 of the '477 patent, the secondary containment pipe merely serves as a housing or conduit for sections of the primary supply pipe which may be inserted or removed as desired.

In my U.S. Pat. No. 5,398,976, I disclosed a connecting boot that substantially improves utilization of the interstitial space. The connecting boot, commonly known as a "test boot", comprises a device which fits onto one terminal end of a supply pipe, allowing the inner primary supply pipe to extend out from the connecting boot while the outer secondary containment pipe terminates inside the connecting boot. The exit end of the test boot where the primary supply pipe exits is clamped to, or otherwise sealingly engages, the outer surface of the primary pipe. The entrance end of the test boot that fits over the exterior of the secondary containment pipe is also clamped to, or is sealingly engaged with, the outer pipe surface. In between these two sealed ends of the test boot is a chamber, which communicates with the interstitial spaces of the two pipes and also communicates with a radially extending port. An elbow fitting and tube is usually provided which can be connected to the radially extending port and elbow fitting on the adjacent pipe, to which the primary pipe has been attached in a conventional manner.

Thus, for the first time, it was possible to connect not only the interstitial spaces of two adjacent pipes but also the interstitial spaces of an entire system, which are connected to a single monitoring device. Such a monitoring device could be a system whereby the entire interstitial space of all of the piping is filled with a liquid to a level, which registers in a predetermined range of the monitoring device to indicate a securely contained system. When the level of the fluid in the interstitial space either drops below a certain amount or rises above a certain amount, indicating a change in the system, an alarm will sound.

The test boot provided a substantial advance in the hazardous fluid piping system industry, primarily by permitting interconnection of all of the system wide interstitial spaces. The test boot, however, is not as structurally solid as an access sump, for example, and thus needs to be enclosed in a sump for protection.

There are several additional considerations that need to be addressed in designing the connections between sections of pipes, particularly between sections of flexible coaxial pipes. First, it is desirable to avoid plastic adhesion or plastic thermally bonded connections, since temperature conditions, chemical exposure, vibrations over time can cause piping joints to fail. A much better seal is achieved when metal and plastic are joined together by mechanical means. However, in such cases it is necessary to protect the metal from the environment by a coating or isolation to avoid a corrosive and unsafe condition. Coatings on metal parts, however, often peel off or become damaged during handling of the metal parts. Also, if the coatings are too thick, the necessary metal to plastic contact to establish an effective seal is not achieved.

As will be apparent from reviewing the above patents, there is an interstitial space between the inner primary supply pipe and the outer secondary containment pipe. This interstitial space has been used to transfer leaked fluid into the containment sump or access chamber. Typically, in early systems, the access chambers were inspected on a regular basis to see if quantities of fluid had collected. This, of course, does not provide a rapid response to a major leak of fluid such as fuel from the primary supply pipe.

As shown in the '794 and the '876 patents, the entire system is connected such that the primary pipe functions as a closed system, transporting fuel from the supply tank to the various dispensers. However, the interstitial space between the primary supply pipe and the secondary containment pipe is a conduit allowing leaked fluid to flow to an access chamber for observation. Although it is possible to monitor the conditions of one or all of the access chambers, for example by visual inspection, no simple method of monitoring the entire system is possible.

It is desirable to provide an underground piping system which employs coaxial pipe, such as those pipes described above, which include a inner primary supply pipe and a outer secondary containment pipe, in which the interstitial space between the two pipes can be connected to the interstitial spaces in other segments of piping to form a continuous closed system of interstitial space.

It is also desirable to provide a coupling assembly for use with coaxial pipes that permits coupling of the interstitial space between the coaxial pipes with corresponding interstitial spaces in other segments of pipe.

Such a system should also provide an effective monitoring system utilizing the interconnected interstitial space of the coupling assembly, particularly with the use of a constant vacuum or pressure applied to the interstitial space or monitoring the liquid level of a liquid filled interstice.

SUMMARY OF THE INVENTION

The invention is a pipe system for distributing fluids from a storage tank to one or more dispensers comprising an originating adaptor fitting located at the tank and shear valves located at each of the one or more dispensers, a pipe segment extending between the adapter fitting and one of the shear valves, the pipe segment having an interstitial space between an inner and an outer pipe. The invention further comprises a transition coupling connecting the adaptor fitting to the pipe segment, the transition coupling comprising a ferrule, an insert, a means for securing the coupling to the adaptor fitting, the transition coupling further comprising sealing means for preventing fluid leakage from the coupling connection to the fitting, the coupling further comprising sealing means for preventing fluid leakage from the interstitial space between the inner and outer pipes, and further comprising an interstitial access port for connecting a tube that provides access to the interstitial space between the inner and outer pipes.

BRIEF DESCRIPTION OF THE DRAWINGS

These and other aspects of the present invention of the various details of the operation and construction thereof are hereinafter more fully set forth with reference to the accompanying drawings, wherein.

DETAILED DESCRIPTION OF THE PREFERRED EMBODIMENT

Figure 1:
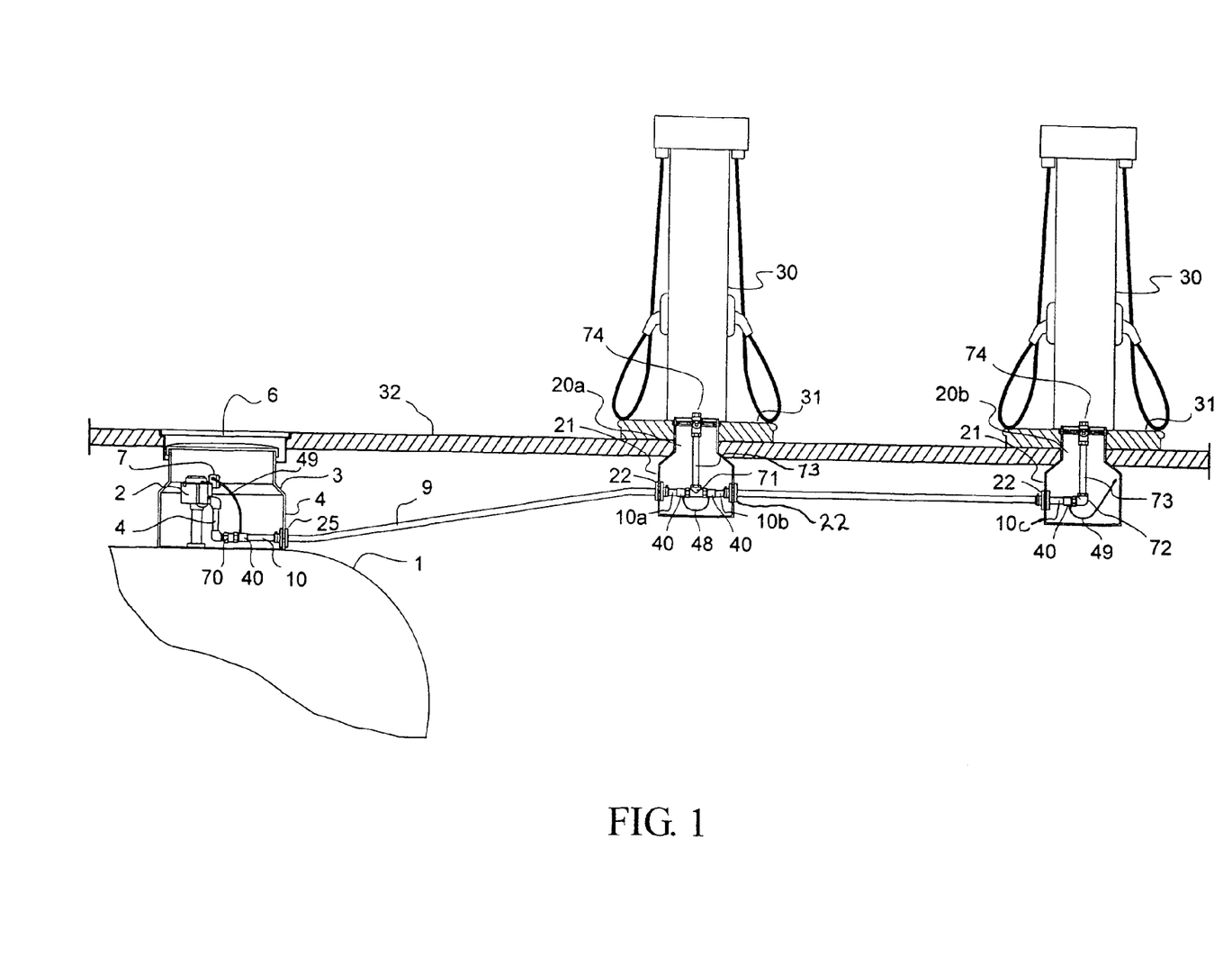
FIG. 1 is a schematic illustration of one embodiment underground piping system.
Figure 2:
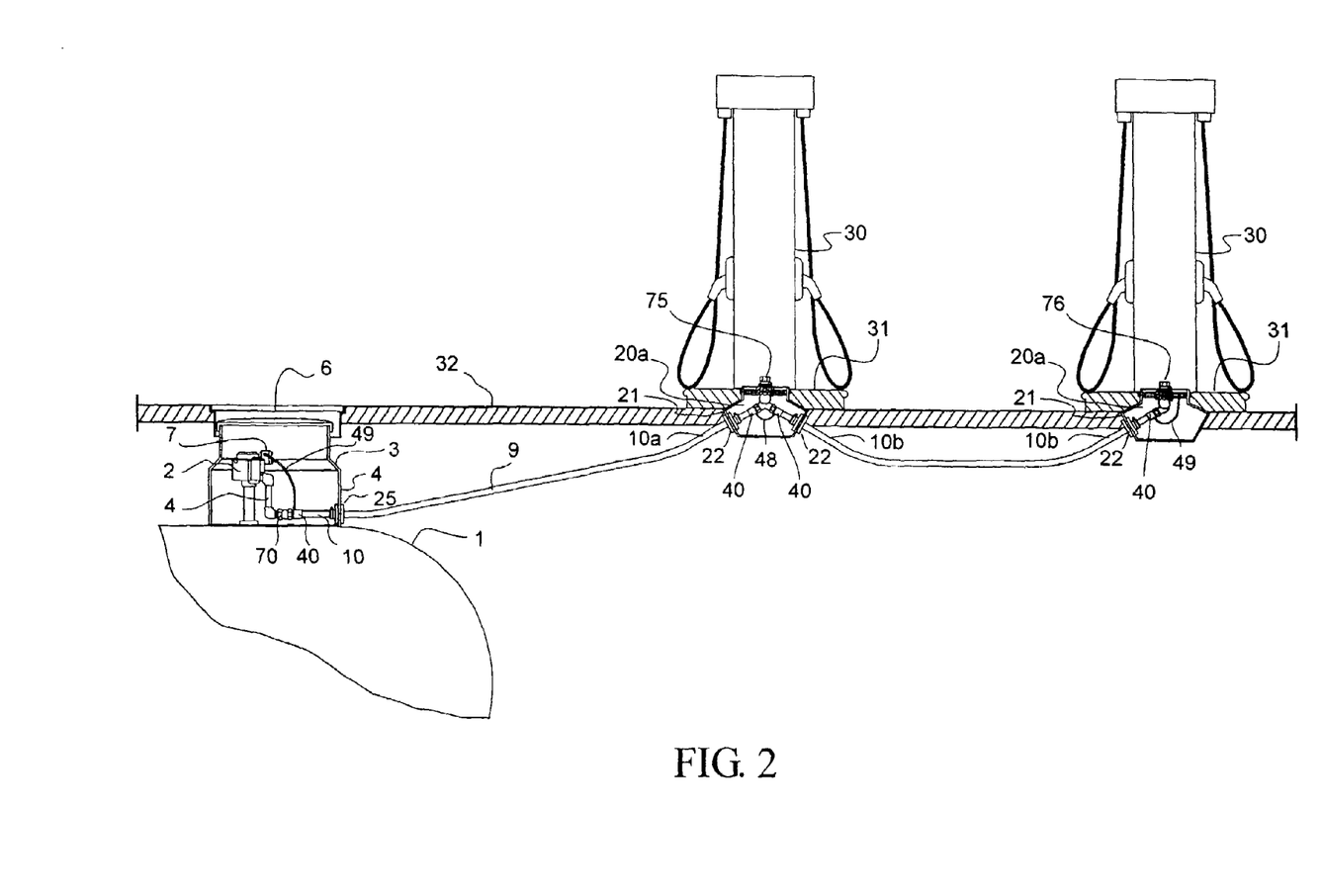
FIG. 2 is a schematic illustration of a second embodiment of underground piping system.

Referring now to the drawings and particularly to FIGS. 1 and 2 thereof, there is shown schematically an underground piping system for conveying petroleum products from an underground storage tank to a plurality of aboveground dispensers. The piping system incorporates a novel coupling means in accordance with the present invention. The pipe transition coupling of the present invention is particularly adapted for interconnecting the interstitial regions in the piping to provide a closed, continuous monitoring system for detecting leaks that provides advantages over prior art piping systems used for this purpose.

As best illustrated in FIG. 1, the basic elements of a underground fuel storage and delivery system include an underground storage tank 1 for containing a large quantity of a petroleum product. The storage tank 1 is equipped with tank sump 3 for secondary containment of the dispensing pump 2 that is connected to the top of the storage tank 1 and located under a manhole cover 6 to provide surface 32 access to the tank sump 3. A plumbing assembly 4, is connected on one end to the dispensing pump 2 and on the other end is fitted with an originating adapter fitting 70 for connection of a transition coupling 40 fitted to the end of a pipe segment 10. The pipe segment 10 exits the sidewall 4 of the tank sump 3 through a sump penetration seal 25 that prevents liquids from entering or exiting the tank sump 3 though the penetration. Also illustrated in FIG. 2 is a sealed attachment of a chase pipe 9 that is used for the future removal and replacement of a damaged pipe section 10 without the need for excavation.

Also shown in both FIGS. 1 and 2 is a monitoring system 7 that is connected to the transition coupling 40 by the test tube 49 to monitor the integrity of the interstitial space of the pipe system. The monitoring system 7 provides early warning of leaks in the underground piping system and thereby to minimize chances of contaminating the underground environment. The monitoring system 7 monitors a change in positive pressure or negative pressure or liquid level within the interstitial space of a double-walled pipe depending upon the type of monitoring system installed. Where there is no monitoring system 7 installed, the test tube 49 would typically be left open at its end for any piping leaks to flow in the tank sump for detection either visual inspection or a sump leak detection monitor.

Referring to FIG. 1, a double wall pipe segment exits the tank sump 3 and then enters the sidewall 21 of a junction dispenser sump 20a, mounted under an above ground dispenser 30. Contained within the deep junction dispenser sump 20a is a riser pipe assembly that typically includes a rigid or flexible riser pipe 73, a standard shear valve 74 and a junction tee fitting 71. The standard shear valve 74 makes connection with the above ground dispenser 30. Pipe segment 10a enters the sidewall 21 of the deep junction dispenser sump 20a and makes connection with the junction tee fitting 71 by means of the transition coupling 40 fitted to its end. Another pipe segment 10b, which is connected to the other side of the junction tee fitting 71, exits the sidewall 21 of the deep junction sump 20a. The pipe entry and exit penetrations in the sidewall 21 are sealed by the pipe penetration seals 22.

The next piping segment 10b exits the first junction dispenser sump 20a and then enters the sidewall 21 of the terminating dispenser sump 20b where the piping system terminates. Contained within a deep terminating dispenser sump 20b mounted under an above ground dispenser 30, is a riser pipe assembly that typically includes a rigid or flexible riser pipe 73, a standard shear valve 74 and a terminating elbow fitting 72. The standard shear valve 74 makes connection with the above ground dispenser 30. A pipe segment 10c enters the sidewall 21 of the deep terminating dispenser sump 20b and makes connection with the terminating elbow fitting 72 by means of the transition coupling 40 fitted to its end. The pipe entry penetrations in the sidewall 21 are sealed by the pipe penetration seal 22.

FIG. 2 has the same basic elements as FIG. 1 with exceptions that the deep dispenser sumps have been substituted with shallow dispenser sumps. Contained within a shallow junction dispenser sump 120a mounted under an above ground dispenser 30, is junction Y shear valve 75 that makes connection with the above ground dispenser 30. A pipe segment 10a enters the angled sidewall 21 of the shallow junction dispenser sump 20a and makes connection with the junction Y shear valve 75 by means of the transition coupling 40 fitted to its end. Another pipe segment 10b, which is connected to the other side of the junction Y, shear valve 75, exits the angled sidewall 21 of the shallow junction sump 120a. The pipe entry and exit penetrations in the sidewall 21 are sealed by the pipe penetration seals 22.

The next piping segment 10b exits the first shallow junction dispenser sump 120a and then enters the angled sidewall 21 of the shallow terminating dispenser sump 120b where the piping system 9 terminates. Contained within a shallow terminating dispenser sump 120b mounted under an above ground dispenser 30, is terminating elbow shear valve 76 that makes connection with the above ground dispenser 30. A pipe segment 10b enters the angled sidewall 21 of the shallow terminating dispenser sump 120b and makes connection with the terminating elbow shear valve 75 by means of the transition coupling 40 fitted to its end.

Figure 3:
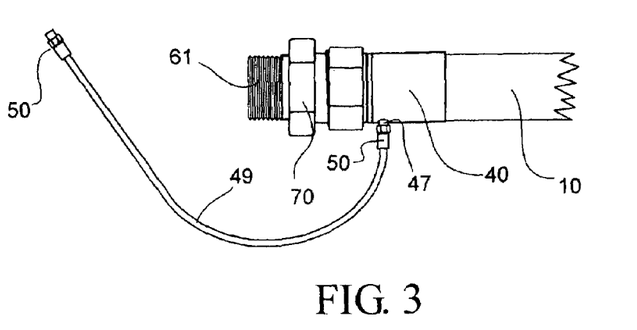
FIG. 3 is a side, elevational view of a originating adapter fitting connected with a transition pipe coupling.

FIG. 3 is close up view of the plumbing connection between the originating adapter fitting 70 connected to a transition coupling 40 fitted on the end of a pipe section 10. Also shown are the tube fittings 50 fitted on each end of the test tube 49 which is connected to the interstitial port 47 of the transition fitting 40 by means of the tube fitting 50.

Figure 4:
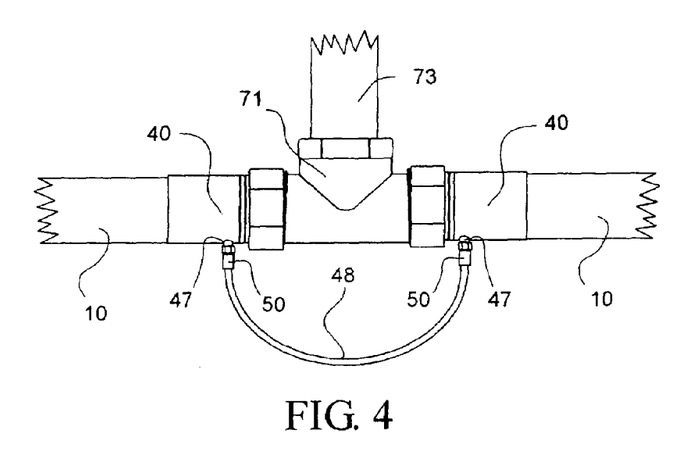
FIG. 4 is a side, elevational view of a junction tee fitting connected with two transition pipe couplings.

FIG. 4 is close up view of the plumbing connection between the junction tee fitting 71 connected to two pipe sections 10 each fitted with a transition fitting 40. Also shown are the tube fittings 50 fitted on each end of a connector tube 48 which is connected to the interstitial port 47 of each transition fitting 40 by means of the tube fitting 50 to continue the interstitial space from one pipe section 10 to the other.

Figure 5:
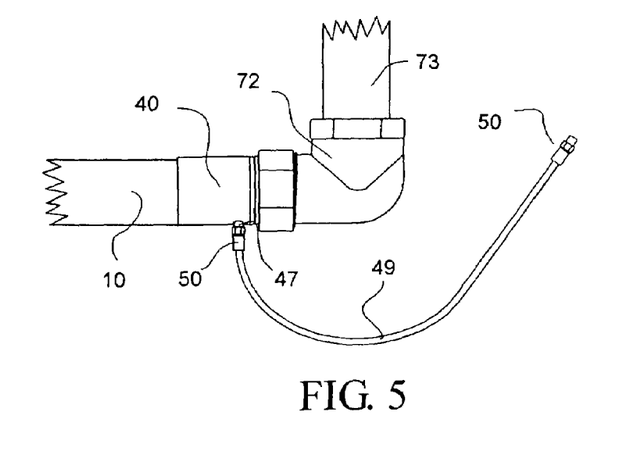
FIG. 5 is a side, elevational view of a terminating elbow fitting connected with a transition pipe coupling.

FIG. 5 is close up view of the plumbing connection between the terminating elbow fitting 72 connected to a transition coupling 40 fitted on the end of a pipe section 10. Also shown are the tube fittings 50 fitted on each end of the test tube 49 which is connected to the interstitial port 47 of the transition fitting 40 by means of the tube fitting 50.

Figure 6:
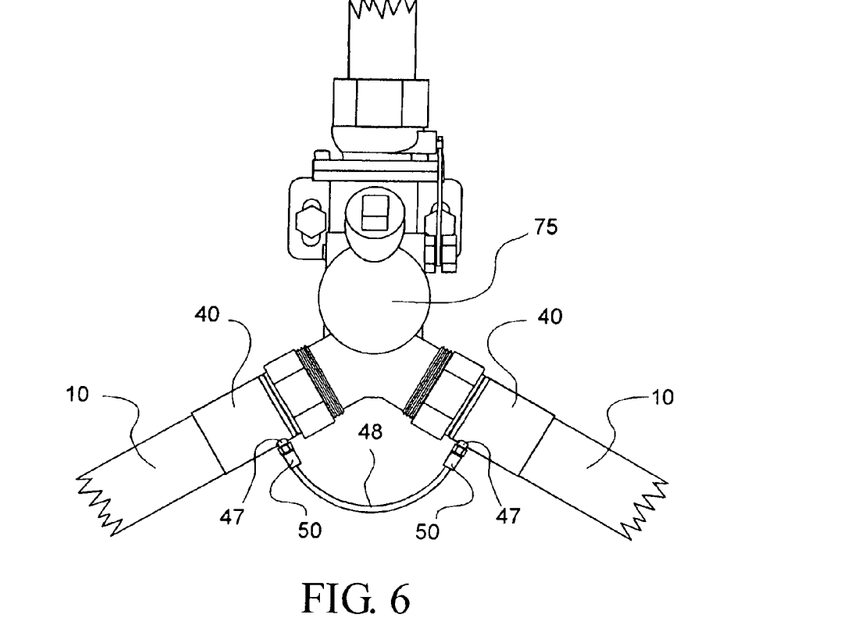
FIG. 6 is a side, elevational view of a junction Y shear valve connected with two transition pipe couplings.

FIG. 6 is close up view of the plumbing connection between the junction shear valves 75 connected to two pipe sections 10 each fitted with a transition fitting 40. Also shown are the tube fittings 50 fitted on each end of a connector tube 48 which is connected to the interstitial port 47 of each transition fitting 40 by means of the tube fitting 50 to continue the interstitial space from one pipe section 10 to the other.

Figure 7:
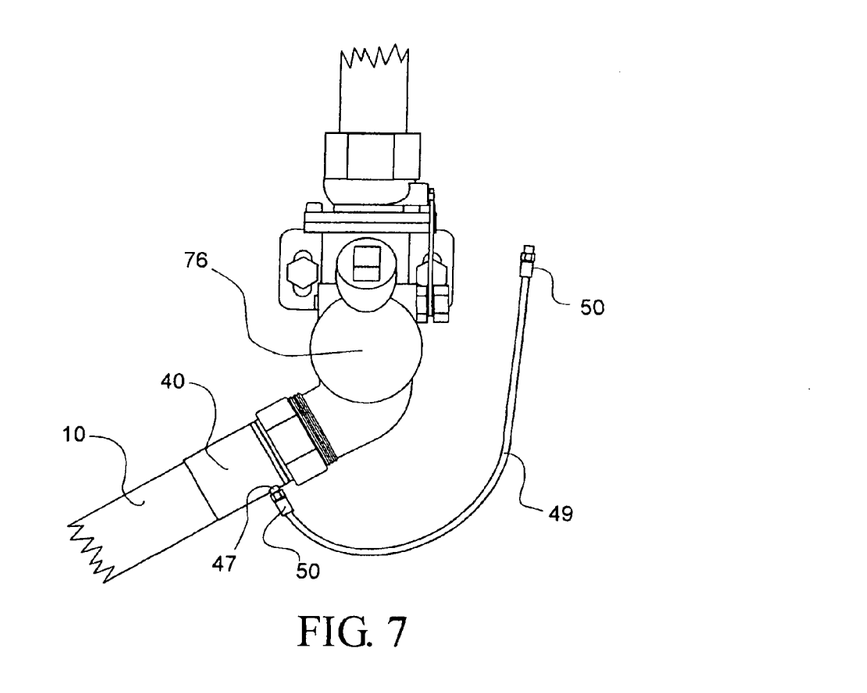
FIG. 7 is a side, elevational view of a terminating shear valve connected with two transition pipe couplings.

FIG. 7 is close up view of the plumbing connection between the terminating elbow shear valves 76 connected to a transition coupling 40 fitted on the end of a pipe section 10. Also shown are the tube fittings 50 fitted on each end of the test tube 49 which is connected to the interstitial port 47 of the transition fitting 40 by means of the tube fitting 50.

Figure 8:
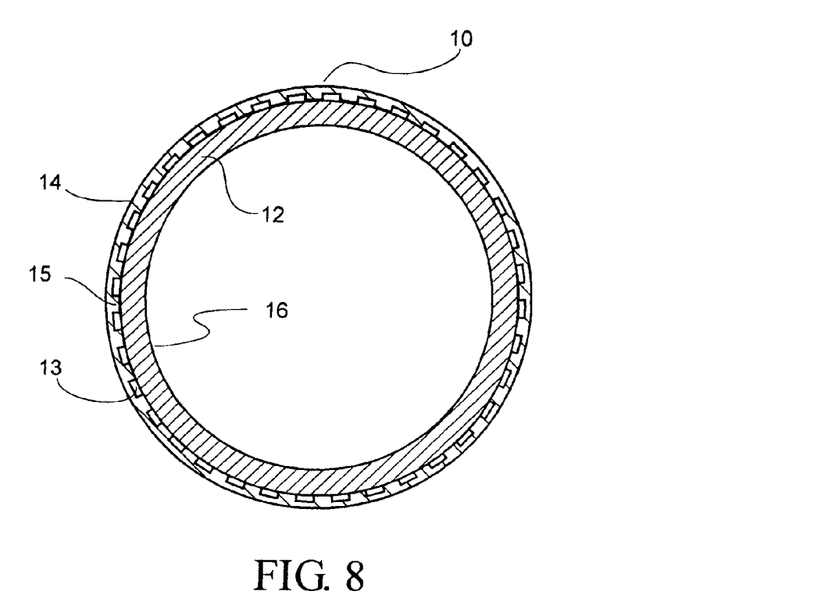
FIG. 8 is an end sectional view of double wall coaxial pipe section.

FIG. 8 shows an end section view of the pipe segments 10 which are preferably co-axial pipes of the type shown and described in my U.S. Pat. No. 5,527,130 entitled Environmentally Safe Underground Piping System, and commercially available from Environ Products, Inc., Smithfield, N.C. (USA) under the trademark GEOFLEX. Pipe segments 10 comprise an inner primary pipe 12 made of a non-degradable or inert material, such as nylon, PVDF and polyethylene, with respect to the petroleum products being handled in the piping system and an outer containment pipe 14 made of a non-degradable or inert material, such as nylon, PVDF and polyethylene when exposed to the ambient environment and thus is suitable for direct burial applications.

The co-axial pipe also has a series of circumferentially spaced longitudinally extending standoff ribs 15 defining a series of longitudinal interstitial spaces 13 or passageways extending from end to end in the pipe segments 10.

The coupling assemblies, called "transition couplings" of the present invention have a double wall design and provide for transition of interstitial spaces in ways that have previously not been possible. Sealing the inner primary pipe is accomplished by a mechanically locked barb seals and radial o-ring seals or flat butt type compression seals. The coupling portion of the present invention effectively seals the inner pipe and the outer pipe simultaneously.

The transition coupling assembly includes a ferrule preferable made of metal, attached to the outer wall of the pipe segment at the coupling end. The ferrule has an annular ring extending from the coupling end of the pipe segment in the axial direction of flow having a series of internal barbs for a sealed and secure engagement of the outer wall of the outer pipe of the pipe segment. The ferrule also has a small threaded interstitial access port for attachment of various tube assemblies that will redirect the path of the interstitial space.

A second component of the transition coupling assembly is an insert, preferably made of metal, which is attached to the inner wall of the pipe segment at its coupling end. The insert, which is expanded into the inner pipe wall, includes an inner annular ring extending from the coupling end of the pipe segment in the direction of fluid flow. An exterior portion of the insert has a series of external barbs for a sealed and secure engagement of the inner wall of the inner pipe of the pipe segment.

In a different type of transition coupling assembly design, the ferrule and insert would be of a one piece construction instead of the two piece construction as described above.

A third component of the transition coupling assembly is an internally threaded swivel nut that is loosely attached to the insert or ferrule/insert in such a manner that it can freely rotate. A preferred means of attaching the swivel nut is to internally expand a portion of the insert to lock on the swivel nut.

A fourth component of the transition coupling assembly is an externally threaded port of a single wall pipe fitting or shear valve, which can be attached to the swivel nut. The externally threaded connection port of the fitting or shear valve allows the swivel nut to draw the coupling insert to or into the port opening for making a sealed connection.

There are two types of sealed connections that are described can be made between the coupling insert and connection ports of the fittings or shear valves. The first is a radially sealed o-ring connection. In this application there are two elastomeric o-rings mounted externally to the sealing surface of the coupling insert. Tightening of the swivel nut draws the male insert into the connection port of the fitting or shear valve where the o-rings seal the outer wall of the insert to the sealing surface of the inner wall of the connection port.

The second application is a butt compression seal application. In this application there is a flat ring seal, typically made of a fluoroelastomeric material. Tightening of the swivel nut draws the end face of the connection port towards the flat ring seal in such a manner that it is compressed between the radial end of the insert and the radial end of the connection port making an effective seal.

The transition coupling further includes an o-ring seal that seals the inside of the ferrule to the outside of the insert. The purpose of this o-ring seal is to create a closed interstice that prevents leaks in the joint located at the end of the ferrule adjacent to the swivel nut. By sealing this joint between the ferrule and insert the interstice can be directed to an interstitial access port extending through the wall of the ferrule.

Having an interstitial access port that is internally threaded provides for the connection of tube assemblies that be used for connection of the interstice of one pipe section to another or may be used for periodic testing of one or more pipe sections.

The integrity of the system is tested by applying pressure or vacuum to the interconnected interstitial spaces of the pipe segments, which have been formed into a closed system. If the pressure or vacuum does not hold over a reasonable period of time, the system likely has one or more fluid leaks. The fittings and other components can then be inspected to locate leaks. Moreover, after the entire system has been operating, the interstitial space may again be subjected to pressure or vacuum to test for leaks. If, for example, a vacuum is lost sooner than a predetermined period of time or takes more than a predetermined time to achieve a given vacuum, this will indicate that a leak is present. Also, a liquid detector in the vacuum system would alert the user to a leak.

It is also possible in accordance with the invention to continuously monitor the interstitial space. One such method is to fill interstitial space of the closed system with a test fluid. This test fluid is then monitored, either visually or automatically, so that a sudden or gradual change in the amount of test fluid in the interstitial space indicates that the system has failed and that a leak exists. For example, if the inner tubular member were damaged, substantial increase in fluid in the interstitial space would occur, causing the fluid level in the monitoring device to rise. Similarly, if the outer tubular member were damaged, the test fluid would leak into the ambient environment and the fluid level in the monitoring device would drop indicating a break in the system. In all cases, controls are provided to override any pumps in operation at the time to shut down the system.

Another method would be to apply a constant positive or negative pressure (vacuum) to the closed interstice of a piping system having one or more piping segments. The pressure would be continuously monitored by an electronic monitoring device that will alarm if there is any significant change in pressure.

Figure 9:
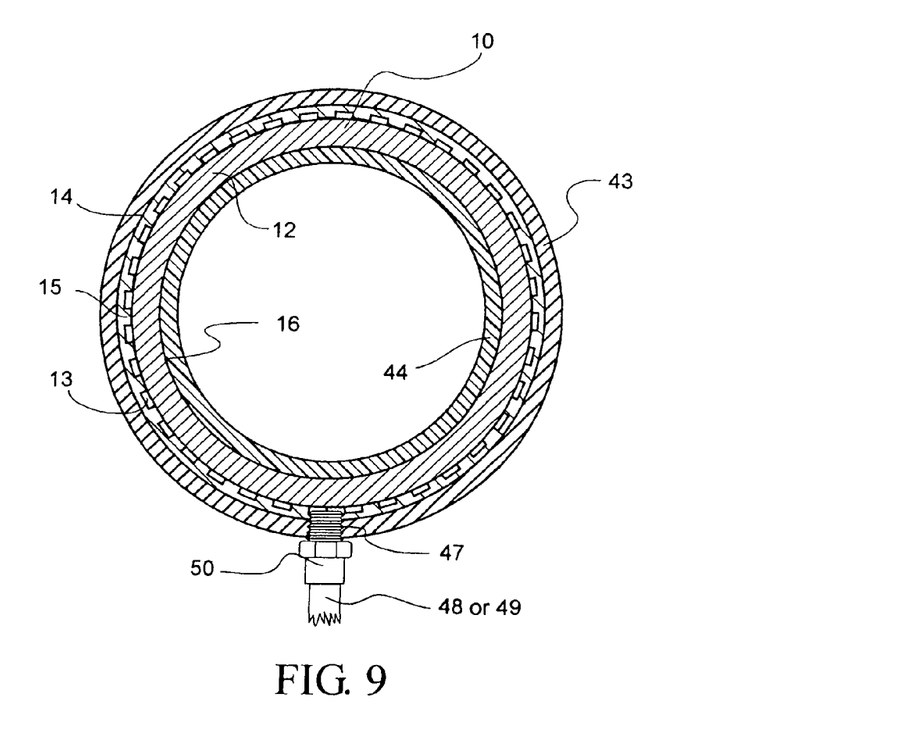
FIG. 9 is an end sectional view of double wall coaxial pipe section fitted with a transition pipe coupling.
Figure 10:
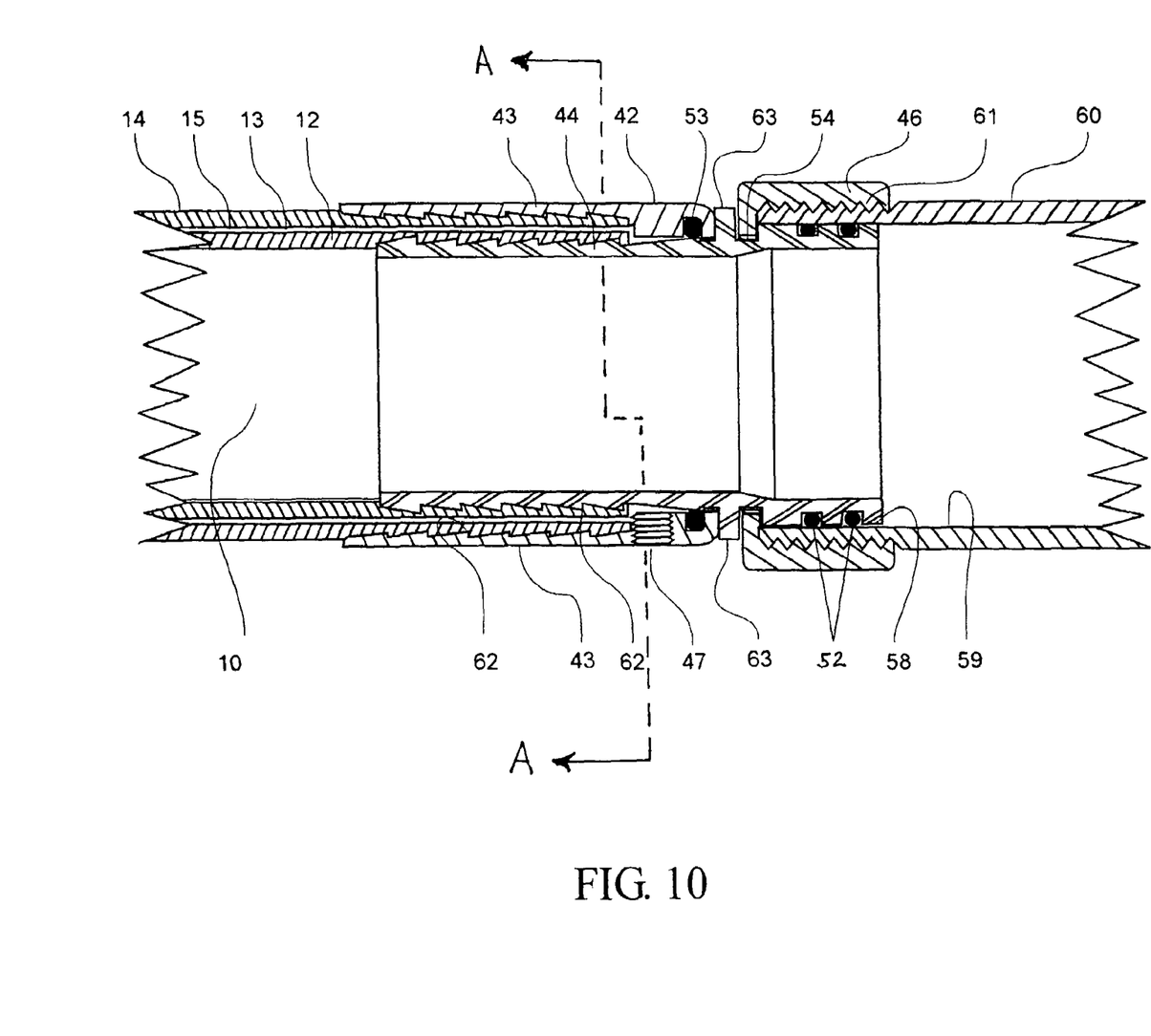
FIG. 10 is a side sectional view of various components that make up o-ring seal transition coupling.

FIG. 9 shows a sectional end view of a coaxial pipe segment 10, fitted with a transition coupling 40 taken along line A—A in FIG. 10. Pipe segment 10 comprises an inner primary pipe 12 and an outer containment pipe 14. The coaxial pipe also has a series of circumferentially spaced longitudinally extending standoff ribs 15 defining a series of longitudinal interstitial spaces 13 or passageways extending from end to end in the pipe segments 10. The end of the pipe segment 10 is fitted with a transition coupling 40 which is partially shown in this illustration to comprise an outer metal ferrule 43. The ferrule has a series of internal annular barbs 62 that engage and secure the outside of the outer pipe 14. A metal insert 44 having external annular barbs 62 engages and secures the inside of the inner pipe 12 when internally expanded with a internal expansion coupling machine. The internal expansion of the metal insert 44 compresses and secures both the inner pipe 12 and the outer pipe 14 in such a manner that it would take a significant force (approx. 3,000 lbs.) to pull the penetration coupling off of the end of the pipe segment 10. The compression caused by the internal expansion is not sufficient to close off the interstitial space 14 created by the standoff ribs 15 on the inside of the outer pipe 14. The threaded interstitial port 47 of the transition coupling 40 is shown to be situated forward of the end of the pipe segment 10 in such a manner that it is in fluid communication with the interstitial space 13 of the pipe segment 10. The interstitial port 47 can be either plugged or connected to a tube fitting 50 of a connector tube 48 or test tube 49.

FIG. 10 is a cross-sectional view of end of a double wall pipe segment 10 fitted with o-ring seal type transition coupling 40. The double wall pipe segment 10 has an outer pipe 14 having standoff ribs 15 (FIG. 9) formed on its inside wall to create an interstitial space 13 between the inner 12 and outer pipe 14. The end of the pipe segment 10 is compressed between the inside of a metal ferrule 43 and the outside surface of the metal insert 44. The inside surface of the metal ferrule 43 has a series of barbs 62 that engage and secure the outside of the outer pipe 14. The outside surface of the metal insert 44 has a series of barbs 62 that engage and secure the inside of the inner pipe 12.

The front inside end metal ferrule 43 has an o-ring seal 53 that seals the joint between the inside of the ferrule 43 and the outside wall of the insert 44. The sealing of this joint allows a closed interstice to be directed through threaded interstitial port 47 located near the front-end wall of the ferrule 43.

A locating rib 63 separates the end of the front end of the ferrule 43 and the swivel nut 46 that is entrapped inside of the locking groove 54 so that it will not come off. The swivel nut 46 has internal female connection threads 61 to mechanical engage the connection port 60 of a fitting or shear valve.

A threaded swivel nut 46 is loosely secured to the insert 44 by means of an internal expansion process that locks it into the locking groove 54. The swivel nut 46 is used to mechanically draw the insert sealing surface 58 that is fitted with two o-ring seals 52 into the connection port 60 of the fitting or shear valve. Within the connection port 60 the two o-ring seals 52 fitted on insert sealing surface 58, engage the port sealing surface 59 to form a liquid tight seal.

Figure 11:
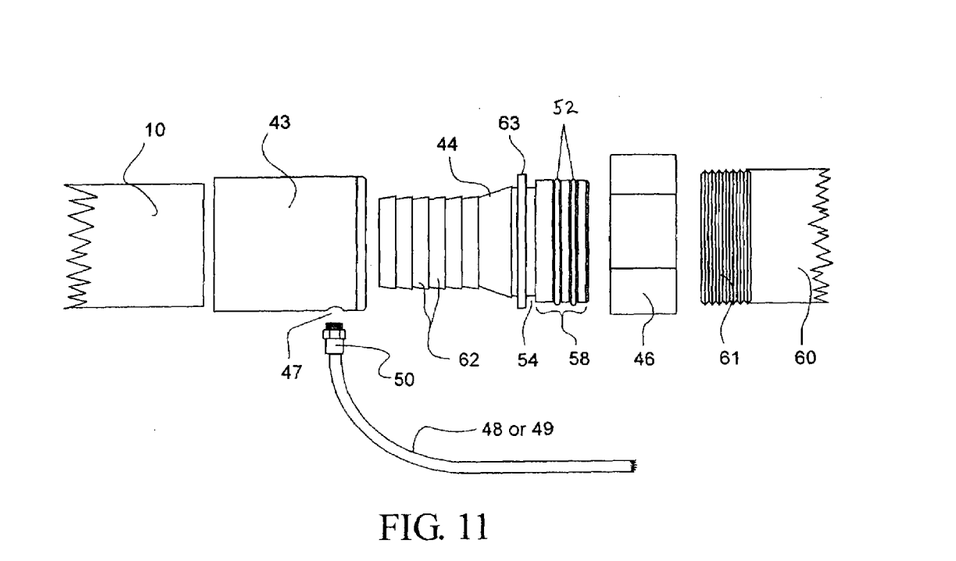
FIG. 11 is a side, elevational view of various components that make up an o-ring seal transition coupling.

FIG. 11 illustrates components of an o-ring seal transition coupling that makes a sealed connection to the inside of connection port 57 of a fitting or shear valve. Shown are the end of the pipe segment 10, the metal ferrule 43 and its interstitial port 47. The metal insert 44 is shown to have external barbs 62 on its back end and two o-ring seals 52 installed on the insert sealing surface 58 on the front end. A swivel nut 46 is loosely secured to the insert 44 by means of an internal expansion process that locks it into the locking groove 54. The swivel nut 46 has internal connection threads (not shown) that engage the external connection threads 61 located on the end section of the connection port 60. The swivel nut 46 is used to mechanically draw the insert sealing surface 58 that is fitted with the two o-ring seals 52 into the connection port 60 of the fitting or shear valve. Within the connection port 60 the o-ring seals 58 fitted on insert sealing surface 58, engage the inside wall (59 in FIG. 10) of the connection port 60 to form a liquid tight seal. Also illustrated is a connector tube 48 or test tube 49, fitted with a tube fitting 50.

Figure 12:
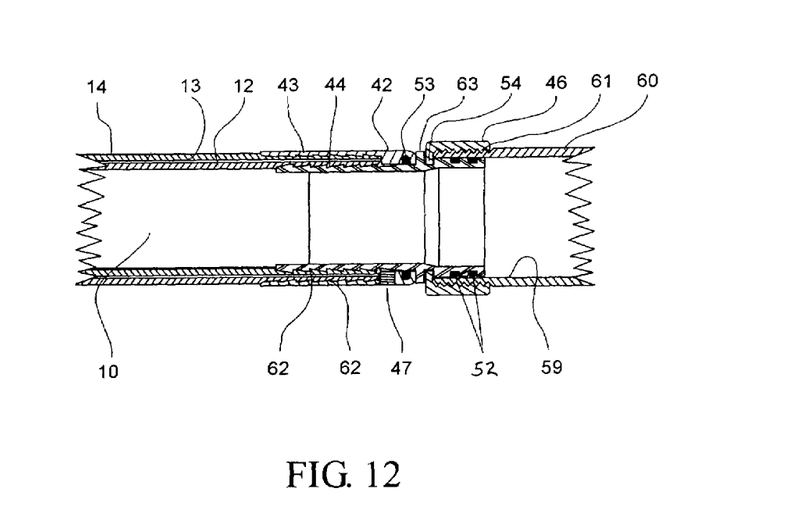
FIG. 12 is a side, sectional view of various components that make up o-ring seal transition coupling.

FIG. 12 is a cross-sectional view of the coupling assembly illustrated in FIG. 11 and described in detail under FIG. 10 descriptions.

Figure 13:
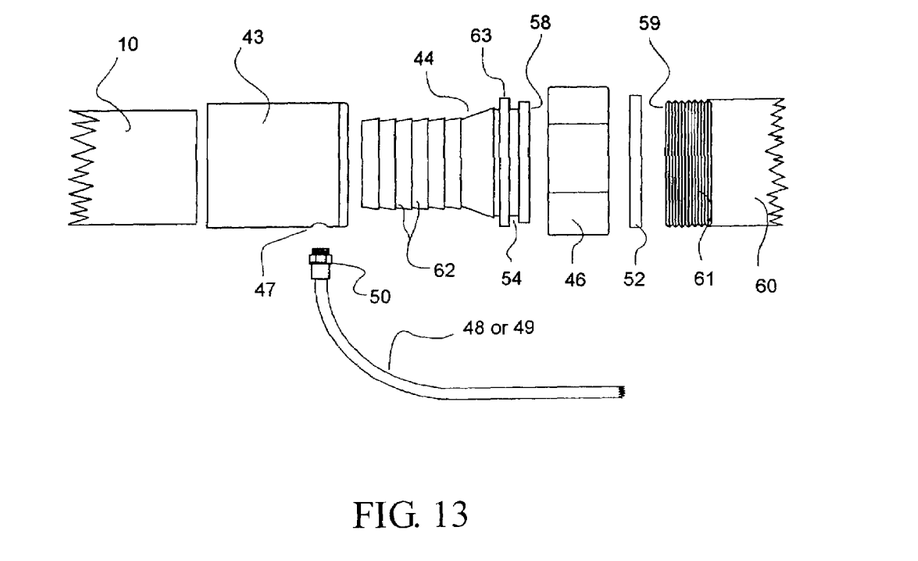
FIG. 13 is a side, elevational view of various components that make up butt seal transition coupling.

FIG. 13 illustrates components of a butt seal transition coupling that makes a sealed connection to the face of connection port 60 of a fitting or shear valve. Shown are the end of the pipe segment 10, the metal ferrule 43 and its interstitial port 47. The metal insert 44 is shown to have external barbs 62 on its back end and a butt type insert sealing surface 58 on the front end. A swivel nut 46 is loosely secured to the insert 44 by means of an internal expansion process that locks it into the locking groove 54. The swivel nut 46 has internal connection threads 61 (not shown) that engage the external connection threads 61 located on the end section of the connection port 60. The swivel nut 46 is used to mechanically draw the insert sealing surface 58, which is fitted with a butt seal 52 to the port sealing surface 59 located on the end of the connection port 60 of the fitting or shear valve. By tightening the swivel nut 46 the butt seal 52 is compressed between the insert sealing surface 58 and the port sealing surface 59 to form a liquid tight seal. Also illustrated is a connector tube 48 or test tube 49, fitted with a tube fitting 50.

Figure 14:
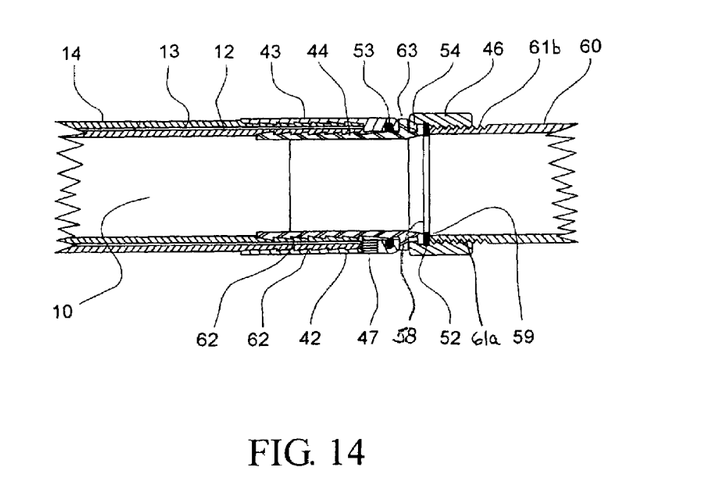
FIG. 14 is a side, sectional view of various components that make up butt seal transition coupling.

FIG. 14 is a cross-sectional view of end of a double wall pipe segment 10 fitted with butt seal type transition coupling. The double wall pipe segment 10 has an outer pipe 14 having standoff ribs formed on its inside wall to create an interstitial space 13 between the inner pipe 12 and under pipe 14. The end of the pipe segment 10 is compressed between the inside of a metal ferrule 43 and the outside of the backend of the metal insert 44. The inside surface of the metal ferrule 43 has a series of barbs 62 that engage and secure the outside of the outer pipe 14. The outside of the metal insert 44 has a series of barbs 62 that engage and secure the inside of the inner pipe 12.

The front inside end of the metal ferrule 43 has an o-ring seal 53 that seals the joint between the inside of the ferrule 43 and the outside wall of the insert 44. The sealing of this joint allows a closed interstice to be directed through threaded interstitial port 47 located near the front end-wall of the ferrule 43.

A locating rib 63 separates the end of the front end of the ferrule 43 and the swivel nut 46 that is entrapped inside of the locking groove 54 so that it will not come off. The swivel nut 46 has internal female connection threads 61a to mechanical engage the connection port 60 of a fitting or shear valve.

A threaded swivel nut 46 is loosely secured to the insert 44 by means of an internal expansion process that locks it into the locking groove 54. The swivel nut 46 has internal connection threads 61a that engage the external connection threads 61b located on the end section of the connection port 60. The swivel nut 46 is used to mechanically draw the insert sealing surface 58, which is fitted with a butt seal 52 to the port sealing surface 59 located on the end of the connection port 60 of the fitting or shear valve. By tightening the swivel nut 46 the butt seal 52 is compressed between the insert sealing surface 58 and the port sealing surface 59 to form a liquid tight seal.

Figure 15:
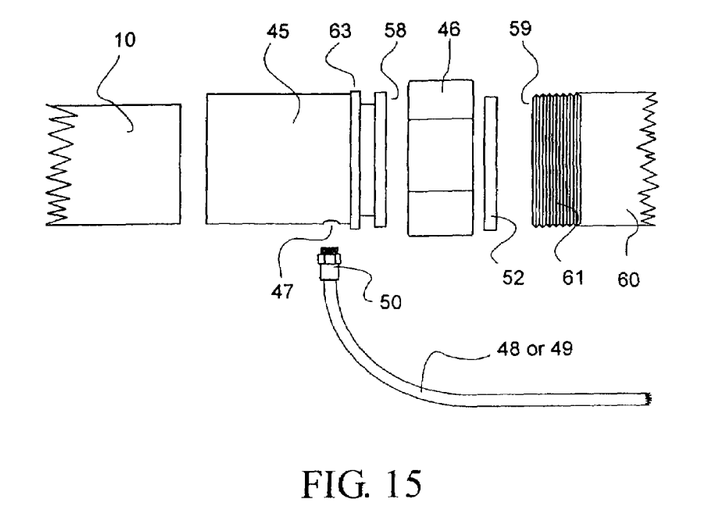
FIG. 15 is a side, elevational view of various components that make up transition coupling with a butt compression seal connection.

FIG. 15 illustrates components of a butt seal transition coupling that makes a sealed connection to the face of connection port 57 of a fitting or shear valve. This particular type transition coupling is like that described under FIG. 13 with the exception that this coupling has ferrule and insert that is of a one-piece construction. Illustrated are the end of the pipe segment 10, the one-piece ferrule/insert 45 and its interstitial port 47. The one-piece ferrule/insert 45 is shown to be a butt type insert sealing surface 58 on the front end. A swivel nut 46 is loosely secured to the insert 44 by means of an internal expansion process that locks it into the locking groove 54. The swivel nut 46 has internal connection threads (not shown) that engage the external connection threads 61 located on the end section of the connection port 60. The swivel nut 46 is used to mechanically draw the insert sealing surface 58, which is fitted with a butt seal 52 to the port sealing surface 59 located on the end of the connection port 60 of the fitting or shear valve. By tightening the swivel nut 46 the butt seal 52 is compressed between the insert sealing surface 58 and the port sealing surface 59 to form a liquid tight seal. Also illustrated is a connector tube 48 or test tube 49, fitted with a tube fitting 50.

Figure 16:
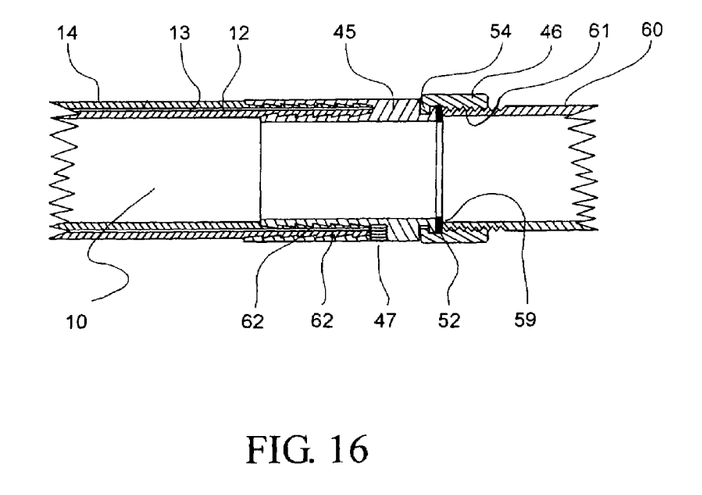
FIG. 16 is a side, sectional view of various components that make up butt seal transition coupling.

FIG. 16 is a cross-sectional view of end of a double wall pipe segment 10 fitted with butt seal type transition coupling like that described under FIG. 13 with the exception that this coupling has ferrule and insert 45 that is of a one-piece construction. Illustrated are the double wall pipe segment 10 that has an outer pipe 14 having standoff ribs formed on its inside wall to create an interstitial space 13 between the inner pipe 12. The end of the pipe segment 10 is compressed within the interior walls of the one piece ferrule/insert that has a series of barbs 62 on each interior wall to engage and secure the end of the pipe section 10 when compressed. A ferrule/insert 45 of one-piece construction has no backend joint thus no o-ring seal is necessary to cause the closed interstice to be directed through threaded interstitial port 47 located near the front end-wall of the ferrule 43.

The locating rib 63 separates the end of the front end of the ferrule 45 and the swivel nut 46 that is entrapped inside of the locking groove 54 so that it will not come off. The swivel nut 46 has internal female connection threads 61 to mechanical engage the connection port 60 of a fitting or shear valve.

The threaded swivel nut 46 is loosely secured to the insert 44 by means of an internal expansion process that locks it into the locking groove 54. The swivel nut 46 is used to mechanically draw the insert sealing surface 58, which is fitted with a butt seal 52 to the port sealing surface 59 located on the end of the connection port 60 of the fitting or shear valve. By tightening the swivel nut 46 the butt seal 52 is compressed between the insert sealing surface 58 and the port sealing surface 59 to form a liquid tight seal.

One advantage of the present invention is that that the transition coupling permits the interstitial space of the entire piping system to be interconnected into one closed system. Thus, the interconnected interstitial space can be subjected to pressurized air, preferably, pressurized nitrogen, to test the entire system at one time. Moreover, liquid or gas interstitial monitoring is readily obtained using the present invention. A beneficial advantage of the present invention is that couplings, fittings and connectors are non-elastomeric and not degradable so the interstice may be pressurized to a much higher level if required.

The transition coupling will not degrade after long-term exposure to fuel, water, microbes, ozone or UV. Installation of this transition coupling is much faster and more efficient than systems that incorporate rubber test boots. Additionally, the transition coupling assembly, system and method are capable of withstanding stress from movement of the system as tanks are filled and emptied and as water tables affect the components of the system.

Even though particular embodiments of the present invention have been illustrated and described herein, the description and drawings are not intended to limit the invention and changes and modifications may be made therein within the scope of the following claims.

I claim:

1. A pipe system for distributing fluids from a storage tank to one or more dispensers comprising:
   an originating adaptor fitting located at the tank and shear valves located at each of the one or more dispensers;
   a pipe segment extending between the adaptor fitting and one of the shear valves, said pipe segment having an interstitial space between an inner and an outer pipe;
   a transition coupling connecting the adaptor fitting to the pipe segment, said transition coupling comprising a ferrule, an insert, a means for securing the coupling to the adaptor fitting; said transition coupling further comprising sealing means for preventing fluid leakage from the coupling connection to the fitting, said coupling further comprising sealing means for preventing fluid leakage from the interstitial space between the inner and outer pipes, and further comprising an interstitial access port for connecting a tube that provides access to the interstitial space between the inner and outer pipes.

2. The piping system of claim 1, wherein
   the sealing means for preventing leakage from the coupling connection to the fitting and the sealing means for preventing leakage from the interstitial space of the pipe are O-rings.

3. The piping system of claim 1, wherein
   the sealing means for preventing leakage from the coupling connection to the fitting is a butt seal compressed between the coupling insert and the adaptor fitting.

4. The piping system of claim 1, wherein
   the means for securing the transition coupling to the fitting include a threaded end on the adaptor fitting and a swivel locking nut on the coupling.

5. The piping system of claim 1, further comprising
   a tube assembly for attachment to the transition coupling interstitial access port for testing and monitoring the interstitial space of the piping system.

6. A pipe system for distributing fluids from a storage tank to one or more dispensers comprising:
   a plurality of dispenser sumps, each housing a shear valve having inlet and outlet ports for respectively receiving and transmitting fluid in a piping system,
   a double-walled pipe having an interstitial space between an inner pipe and an outer pipe, said pipe comprising an inlet pipe segment and an outlet pipe segment for connection to each shear valve port, each pipe segment joined to the respective inlet and outlet ports of the shear valve by a transition coupling, said transition coupling comprising;
   a ferrule, an insert, a means for securing the coupling to the adaptor fitting; said transition coupling further comprising sealing means for preventing fluid leakage from the coupling connection to the fitting, said coupling further comprising sealing means for preventing fluid leakage from the interstitial space between the inner and outer pipes, and further comprising an interstitial access port for connecting a tube that provides access to the interstitial space between the inner and outer pipes.

7. The piping system of claim 6, wherein
   the sealing means for preventing leakage from the coupling connection to the shear valve and the sealing means for preventing leakage from the interstitial space of the pipe are O-rings.

8. The piping system of claim 6, wherein
   the sealing means for preventing leakage from the coupling connection to the shear valve is a butt seal compressed between the coupling insert and the shear valve port.

9. The piping system of claim 6, wherein
   the means for securing the transition coupling to the fitting include a threaded end on the adaptor fitting and a swivel locking nut on the coupling.

10. The piping system of claim 6, wherein
    a tube is connected from the interstitial access port of the transition coupling at the shear valve inlet port to the transition coupling of the shear valve outlet port, said tube providing a continuous path around the shear valve for the interstitial space of the double-wall pipe.

11. The piping system of claim 6, further comprising
    a tube assembly for attachment to the transition coupling interstitial access port for testing and monitoring the interstitial space of one or more pipe segments.

12. The piping system of claim 6 wherein said interstitial access port is connected with a test tube for continuous monitoring of the integrity of the double-wall pipe system interstitial space.

13. A piping system of double-wall pipe having an interstitial space between an inner and an outer pipe, comprising:
    one or more pipe sections each pipe section connecting to one or more fittings selected from the group consisting of adaptor fittings, shear valves, and terminating elbow fittings,
    wherein the connections between each fitting and pipe section is made with a transition coupling comprising a ferrule, an insert, a means for securing the coupling to the fitting; said transition coupling further comprising sealing means for preventing fluid leakage from the transition coupling connection to the fitting, said coupling further comprising sealing means for preventing fluid leakage from the interstitial space between the inner and outer pipes, and further comprising an interstitial access port for connecting a tube that provides access to the interstitial space between the inner and outer pipes.

14. The piping system of claim 13, wherein
the sealing means for preventing leakage from the coupling connection to the fitting is a butt seal compressed between the coupling insert and the fitting.

15. The piping system of claim 13, wherein
the means for securing the transition coupling to the fitting includes a threaded end on the fitting and a swivel locking nut on the coupling.

16. The piping system of claim 13, wherein
the ferrule and insert are a single-piece construction.

17. The piping system of claim 16, wherein
said single-piece ferrule and insert comprises:
a dual cylindrical portion having an outer cylinder and an inner cylinder, wherein the outer cylinder is the ferrule and the inner cylinder is an insert into the double-wall pipe; the outer cylinder comprising barbs on its inner surface for engagement with the outer pipe of the double-wall pipe, the inner cylinder comprising barbs on its outer surface for engagement with the inner pipe of the double-wall pipe.

18. The piping system of claim 13, further comprising
a tube assembly for attachment to the transition coupling interstitial access port for testing and monitoring the interstitial space of one or more pipe segments.

19. The piping system of claim 13 wherein said interstitial access port is connected with a test tube for continuous monitoring of the integrity of the double-wall pipe system interstitial space.

\* \* \* \* \*